(12) United States Patent
Gifford et al.

(10) Patent No.: US 7,010,377 B2
(45) Date of Patent: Mar. 7, 2006

(54) METHOD, SYSTEM, AND STORAGE MEDIUM FOR FACILITATING A TRANSPORT SCHEME IN AN AUTOMATED MATERIAL HANDLING SYSTEM ENVIRONMENT

(75) Inventors: Jeffrey P. Gifford, Fishkill, NY (US); George M. Harmuth, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/709,356

(22) Filed: Apr. 29, 2004

(65) Prior Publication Data

US 2005/0246046 A1    Nov. 3, 2005

(51) Int. Cl.
*G06F 19/00* (2006.01)

(52) U.S. Cl. .................. 700/115; 700/112; 700/113; 700/116; 700/219; 700/220; 700/223; 700/228; 414/217; 414/273; 414/270; 414/793.5; 404/181

(58) Field of Classification Search ............... 700/112, 700/113, 115, 116, 213, 214, 217, 218, 219, 700/220, 223, 228; 404/187; 414/793.5, 414/217, 273, 270
See application file for complete search history.

(56) References Cited

U.S. PATENT DOCUMENTS

| | | | | |
|---|---|---|---|---|
| 4,829,445 A | * | 5/1989 | Burney | 700/230 |
| 4,837,704 A | * | 6/1989 | Lengefeld | 700/216 |
| 5,222,855 A | * | 6/1993 | Bernard et al. | 414/331.03 |
| 5,842,917 A | * | 12/1998 | Soung et al. | 454/187 |
| 6,240,335 B1 | * | 5/2001 | Wehrung et al. | 700/230 |
| 6,516,242 B1 | * | 2/2003 | Brown | 700/216 |
| 6,615,093 B1 | * | 9/2003 | Chung et al. | 700/100 |
| 6,622,127 B1 | * | 9/2003 | Klots et al. | 705/28 |
| 6,766,285 B1 | * | 7/2004 | Allen et al. | 703/22 |
| 6,810,294 B1 | * | 10/2004 | Rangachari et al. | 700/97 |
| 6,871,116 B1 | * | 3/2005 | Brust et al. | 700/245 |
| 2002/0161618 A1 | * | 10/2002 | Weiss et al. | 705/8 |

* cited by examiner

*Primary Examiner*—Ramesh Patel
(74) *Attorney, Agent, or Firm*—Lisa U. Jaklitsch; Cantor Colburn LLP

(57) ABSTRACT

A method, system, and storage medium for facilitating a transport scheme in an automated material handling system environment are provided. The method includes detecting an occurrence of a trigger event while monitoring production operations in an automated material handling system environment, identifying a materials candidate to purge from a production line in response to the trigger event, production data captured relating to the materials candidate, and user-defined criteria for purging materials from the production line. The method also includes selecting a disposition plan for handling the materials candidate, generating a transport process job for the materials candidate for instructing the automated material handling system on executing the disposition plan, and transmitting the transport process job to the automated material handling system for execution.

20 Claims, 4 Drawing Sheets

```
[2003/12/09 14:29:56.19, 64, 1, R, [Si PRO9]:TransferJob Request]
<L,2
 <L,3
   <A[ 0]:XferJobID="">
   <B:XferType=00>
   <A[ 6]:JobOwnerID="SIVIEW">
  >
 <L,1 : Number Of TransferJob
  <L,2
   <A[ 16]:CarrierID="0000000000008166">
   <L,4 : Number Of Attributes
    <L,2
     <U2:AttrID=24010>
     <L,2 : CarrierAttr
       <A[ 0]:ZONETYPE="">
       <B:N2PURGEFLAG=00>
      >
    >
    <L,2
     <U2:AttrID=24020>
     <L,4 : CarrierJobReqAttr
       <A[ 0]:EXP_STARTTIME="">
       <A[ 0]:EXP_ENDTIME="">
       <B:MANDATORYFLAG=00>
       <U2:PRIORITY=3>
      >
    >
    <L,2
     <U2:AttrID=24080>
     <L,2 : SourceAttr
       <A[ 4]:EQUIPMENTID="KGO4">
       <A[ 3]:PORTID="I02">
      >
    >
    <L,2
     <U2:AttrID=24090>
     <L,2 : DestArrayAttr
       <A[ 0]:STKGROUPID="">
       <L,1 :
        <L,2 :
          <A[ 4]:EQUIPMENTID="MAO4">
          <A[ 0]:PORTID="">
         :end
```

FIG. 4

METHOD, SYSTEM, AND STORAGE MEDIUM FOR FACILITATING A TRANSPORT SCHEME IN AN AUTOMATED MATERIAL HANDLING SYSTEM ENVIRONMENT

BACKGROUND OF INVENTION

The present invention relates generally to materials management, and more particularly, to a method, system, and storage medium for facilitating a transport scheme in an automated material handling system environment.

In a production environment, there are quantities of materials that sit idle in local storage (e.g., stockers) until a production machine is ready to receive them. When there is a large amount of materials in a given production line, the local stockers can become filled to capacity and the production area becomes backed up. In order to free up space in the production environment, many of these materials are transported to a centralized storage location until they are needed. Automated material handling systems (AMHSs) provide some assistance in managing the transport of these materials within a production area. AMH systems generally consist of material handling equipment and a material control system. The material handling equipment manages the flow of materials, while the control system manages the flow of information relating to these materials. Where an automated material handling system (AMHS) is employed, these idle materials are often automatically transferred to central storage when a stocker is full, regardless of whether the materials will be needed by the production line soon.

This process can result in unnecessary transport, both to the central storage location and back to production, of the materials in cases where the production equipment requires these materials in a short period of time. As central storage may be located a significant distance away from the production area, additional costs are incurred in transporting these materials. These costs include the actual cost of transport (e.g., capital cost, storage fees, overhead, wear and tear, floor space, and support) and the costs of additional cycle time and reduced equipment utilization, since a process tool may sit idle waiting for work to arrive.

What is needed, therefore, is a way to intelligently determine and execute the transport requirements for materials in a production environment.

SUMMARY OF INVENTION

Exemplary embodiments of the invention include a method, system, and storage medium for facilitating a transport scheme in an automated material handling system environment. The method includes detecting an occurrence of a trigger event while monitoring production operations in an automated material handling system environment, identifying a materials candidate for purging from a production line in response to the trigger event, production data captured relating to the materials candidate, and user-defined criteria for purging materials from the production line. The method also includes selecting a disposition plan for handling the materials candidate, generating a transport process job for the materials candidate for instructing the automated material handling system on executing the disposition plan, and transmitting the transport process job to the automated material handling system for execution.

BRIEF DESCRIPTION OF DRAWINGS

Referring now to the drawings, wherein like elements are numbered alike in the several FIGURES:

FIG. 4 is computer screen window illustrating a sample transport process job created by the purge tool in exemplary embodiments.

DETAILED DESCRIPTION

The purge tool of the invention enables a production control manager or similar individual to establish customized guidelines for handling production materials assigned to a production line in a manufacturing environment. These guidelines can be changed over time as the needs of the manufacturing plant or enterprise change. The purge tool of the invention uses custom criteria to search materials in a production line for potential candidates for transport to storage, or alternatively, for scrapping purposes. Once a candidate has been identified, the purge tool creates a transport process job for the candidate materials and transmits the transport process job to the automated material handling system of the production environment for execution.

Figure 1:
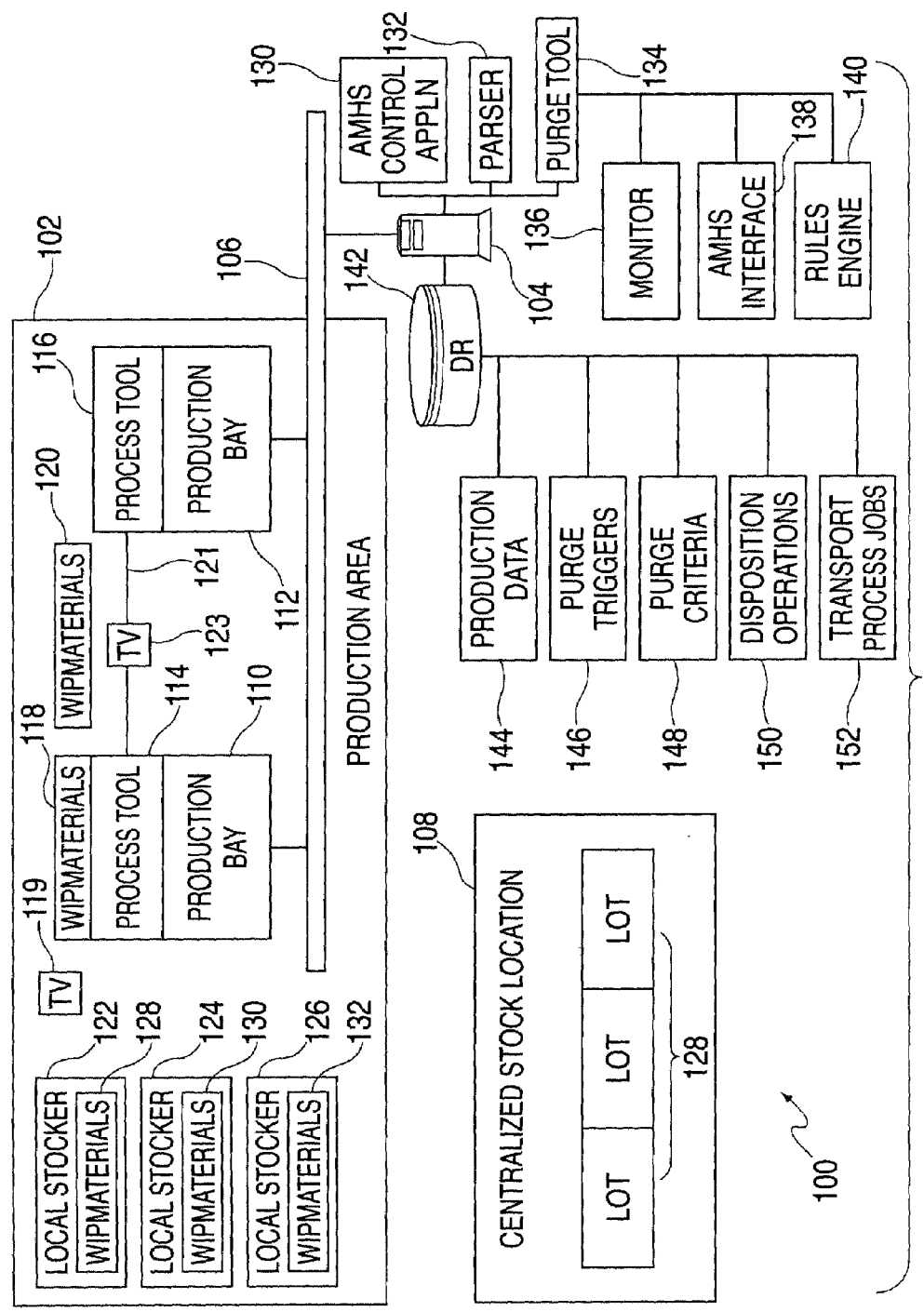
FIG. 1 is a block diagram of a system upon which the purge tool may be implemented in exemplary embodiments.

Referring now to FIG. 1, a system upon which the purge tool may be implemented will now be described. System 100 includes a production area 102 in communication with a server 104 via a network 106. Production area 102 equipment is preferably SEMI-compliant. Also included in system 100 is a centralized stock location 108.

Production area 102 includes two production bays 110 and 112 that, in turn, include two process tools 114 and 116, respectively. Production bay 110 further includes work-in-process (WIP) materials 118 engaged in a process or procedure performed by tool 114. Materials that are used in manufacturing may include substances, component parts, assemblies, and other items typically found in a manufacturing environment. WIP materials refer to those materials that are currently undergoing a machine process or en route between machines or production bays. Materials that are awaiting processing are stored in local storage (e.g., local stockers 122–126). An interbay transport device 121 enables WIP materials such as WIP materials 120 to be conveyed between production bays.

Production bays 110 and 112 each refer to a specific location and equipment device(s) within production area 102 whereby a specified manufacturing process is performed on production materials. Each of process tools 114 and 116, as indicated above, perform one or more processes on WIP materials in accordance with a manufacturing plan. Interbay transport device 121 may be a mechanized ground vehicle such as an automated guided vehicle (AGV) or personal guided vehicle (PGV), or may be an overhead transport (OHT) device supported by a monorail 123 that transfers WIP materials between production bays 110 and 112.

As indicated above, local stockers 122–126 refer to temporary storage devices used to retain materials that are awaiting processing in production area 102. In a typical manufacturing environment, a transport vehicle 119 would retrieve WIP materials from a local stocker and transport the materials to the production bay for which the materials have been assigned. These process materials are assigned to various production bays, some of which materials may be ready for processing within minutes and others that may be waiting for hours or days. For example, the materials 128 stored in local stocker 122 may be assigned to a current job (e.g., next in line in processing), the materials 130 in local stocker 124 may be assigned to a short-term pending job (e.g., ready for processing within minutes or hours), and local stocker 132 may carry materials 132 that are assigned to a long-term pending job (e.g., hours or days). If the scheduled production cycle is interrupted for any period of time, this can result in local stockers filling up to their capacity and also backed-up of process materials and stockers within the production area.

Centralized stock location 108 refers to a storage facility that is remotely located from production area 102. One utility of centralized stock location 108 is to store materials that have been transported from production area 102 to free up space and resources at the manufacturing plant. These materials are awaiting processing in production area 102 and are referred to as lots 128. Centralized stock location 108 may be a storage facility operated by a warehouse entity that charges storage fees for its use or may be a facility operated by the enterprise executing the production processes described herein.

Server 104 executes a variety of business applications utilized by an enterprise for facilitating the production processes occurring in production area 102. Server 104 may be a computer with a high-powered processor for handling the volume of production activities occurring in production area 102. Further, while only a single production area 102 is shown, it will be understood that multiple production areas (e.g., manufacturing facilities) may be managed by server 104 in terms of implementing the purge tool of the invention.

Server 104 executes an automated material handling system control application (AMHS control application) 130 that manages the transport of materials within a production area. Control application 130 may be a material control system (MCS) application such as Murata's Automated Control System by Murata Machinery, Ltd.™ AMHS control application 130 receives operations and scheduling information for processing of materials on equipment in production area 104 via server 104. This information can be obtained from any suitable manufacturing execution system software utilized by the production system enterprise.

Server 104 also executes parser 132, which formats production data used by AMHS control application 130 so that it can be read and understood by the purge tool. The functions of parser 132 are described further herein.

Purge tool 134 is executed on server 104 and includes a monitor component 136, AMHS interface 138, and rules engine 140. Monitor component 136 serves as a watchdog for production operations in area 102 and looks for any activated triggers as will be described further herein. AMHS interface 138 enables purge tool 134 to communicate with AMHS control application 130 for monitoring production operations, searching production data, and transmitting information as described further herein. AMHS interface 138 further enables a user to customize and modify purge criteria and triggers. Rules engine 140 comprises logic for processing triggers, purge criteria, and disposition rules.

Data repository 142 is in communication with server 104 and stores a variety of data used by AMHS control application 130 and purge tool 134. Data repository 144 is logically addressable to server 104 for receiving requests for data and communicating search results to server 104. One type of data stored in data repository 142 is production data 144. Production data 144 refers to the specific information used by AMHS control application 130 to perform production transport activities in accordance with scheduled production operations. For example, production data 144 may include tables identifying each local stocker, the stockers' current load and capacity, the materials carried within the stocker, etc. Detailed performance metrics for stockers may also be stored as part of production data 144 such as relative throughputs, mean stocker cycle times for materials capacity, peak stocker cycle times for materials, stocker mean times between incidents, stocker availability, alarm conditions relating to carrier drops, weight loads, contamination control, charge build up on carrier, etc. These and other SEMI-derived performance metrics standards may be utilized. Production data 144 may also include process steps for manufacturing processes utilized within production area 102, the status of production activities occurring within production bays 110 and 112, etc.

Also stored in data repository 142 are purge triggers 146, purge criteria 148, and disposition operations 150 used by purge tool 134 (collectively referred to as set-up criteria). Purge triggers 146 refer to the events that may be defined as trigger points to initiate an action which results in one or more candidate lots (i.e., WIP materials) to be selected for removal and transport to centralized stock location 108. Trigger points may include a time stamp, a stocker identified as being 'full', a WIP level achieved, a product type, a process time, throughput levels, etc.

Purge criteria 148 refers to the criteria used to determine whether a purge of WIP materials will be performed. Criteria 148 are flexible and may be modified based on the type of trigger event or other user-defined event. For example, a daily search (e.g., timestamp-based search) may utilize one type of purge criteria while a manually requested search may have different criteria. Examples of purge criteria include the age of the product being manufactured for which the materials are scheduled to be processed, the nature and/or class of the product for which the materials are scheduled to be processed, production priorities established for scheduled materials as set out in a production schedule (e.g., changes to priorities due to customer requirements), life span of materials in a production line (e.g., in an electronics manufacturing environment, monitor wafers have a fixed number of times for which they may be reused due to factors such as thermal cycles or coating thickness), lots which have not been processed for a given period of time (e.g., engineering lots, non-product lots, lots involved in a production stop, lost lots, etc.).

Disposition operations component 150 refers to specified actions that will be performed on selected WIPs to be purged, such as a time and manner for transporting the materials, a number and identification of the WIPs to be transported, an origination location and destination location assigned to the WIP materials, and may include any other instructions desired for handling the materials. The disposition may also include instructions for scrapping materials.

Data repository 142 also stores transport process jobs 152. Transport process jobs 152 refer to work orders or directives generated by the purge tool that instruct the AMHS control application 130 to carry out specified operations on candidate materials selected for purging.

Figure 2:
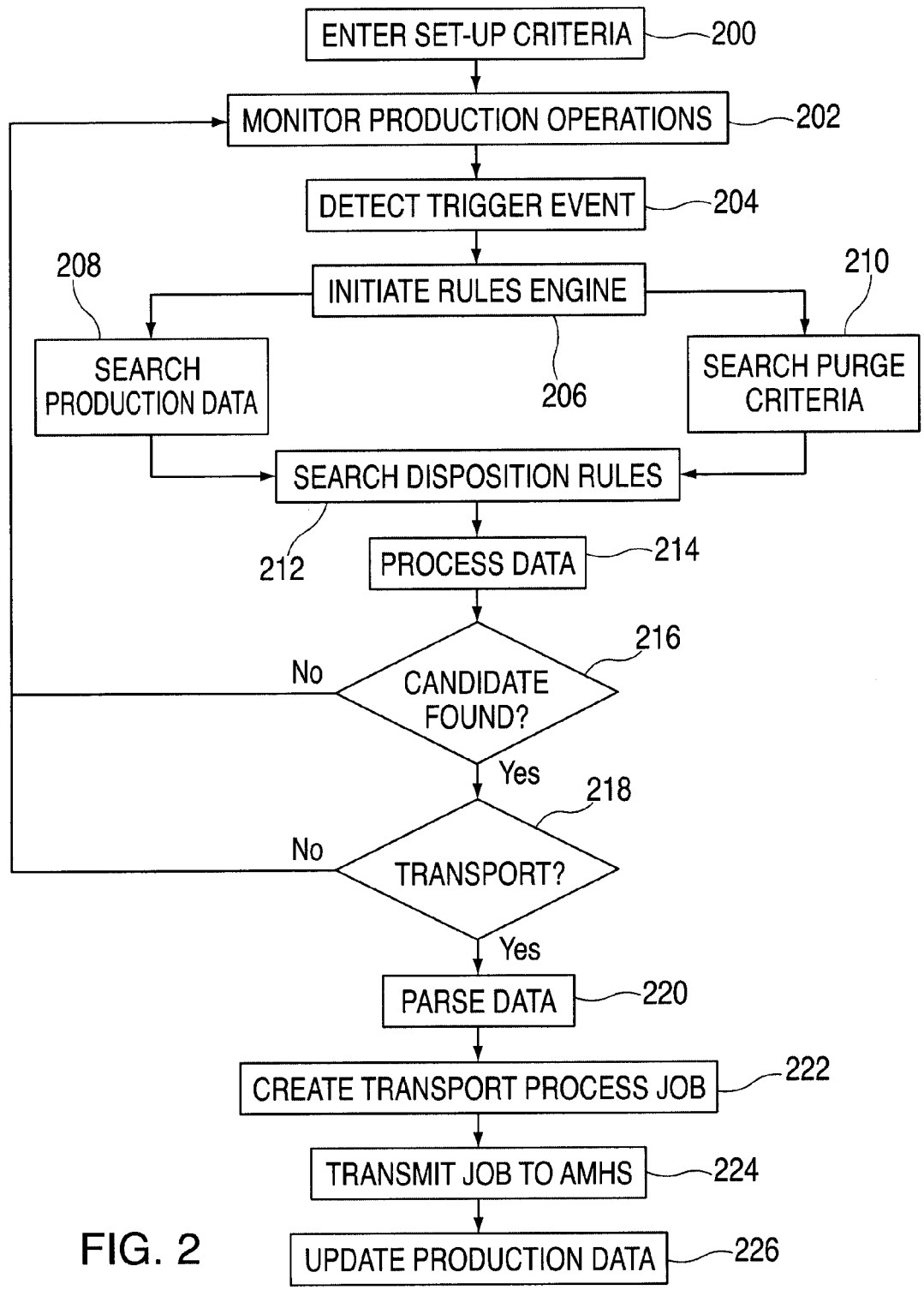
FIG. 2 is a flowchart illustrating a process for implementing the purge tool in exemplary embodiments.
Figure 3:
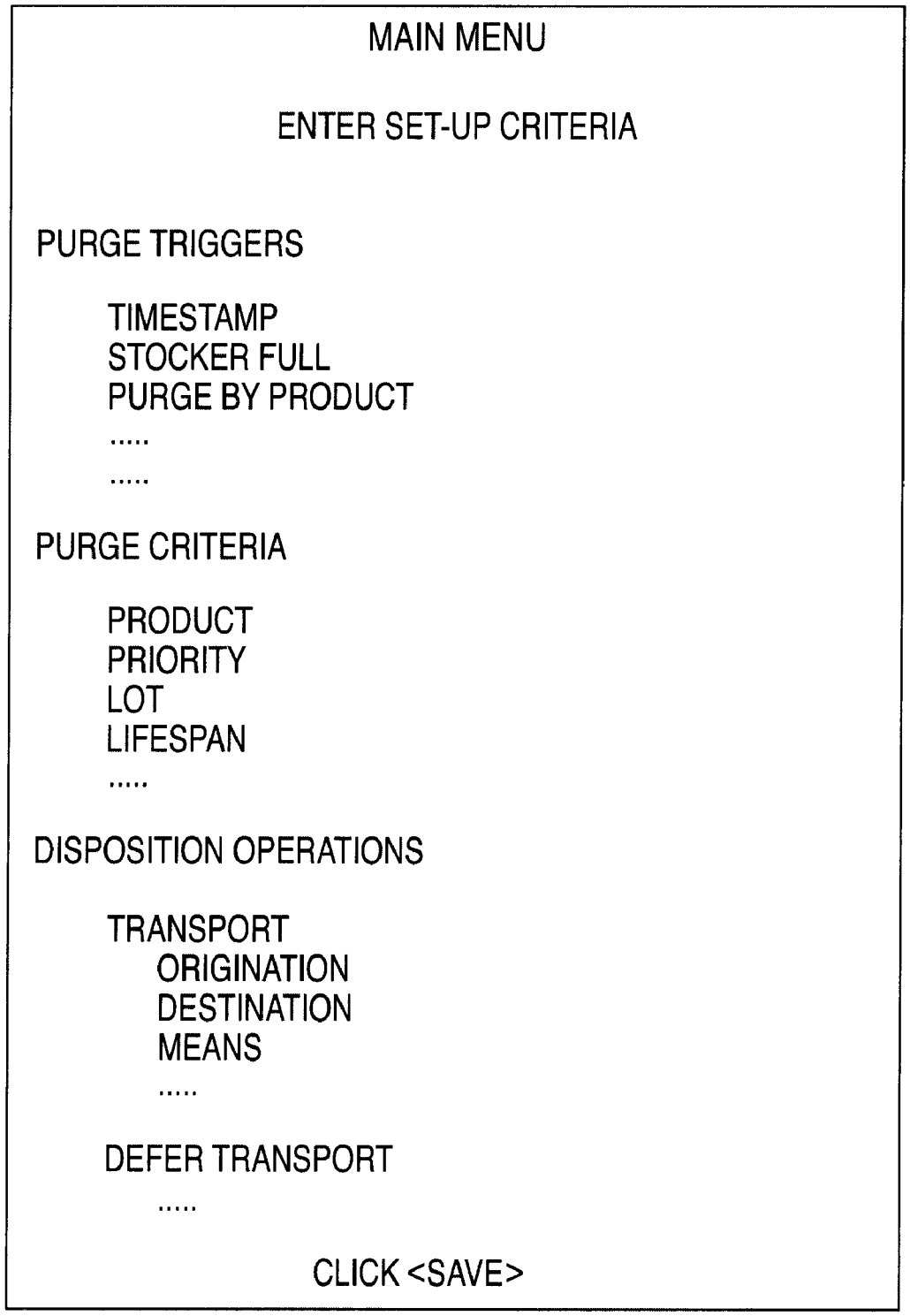
FIG. 3 is a user interface as seen by a production system individual for establishing and/or modifying criteria used by the purge tool in exemplary embodiments.

The above-described and other features of the purge tool will become readily apparently with reference to the description of FIG. 2. Referring now to FIG. 2, a process for implementing the purge tool is described. At step 200, a user of the purge tool 134 enters desired set-up criteria that will define the handling and activities to be performed on materials. A sample user interface screen for implementing step 200 is shown in FIG. 3. Monitor 136 observes production activities occurring on server 104 via AMHS control application 130 and checks for any triggering events at step 202. At step 204, monitor 136 detects a trigger event that has occurred and initiates rules engine 140 at step 206. Rules engine 140 of tool 134 searches production data 144 and captures information relating to the production elements affected by the trigger at step 208. Rules engine 140 also searches purge criteria 148 at step 210 to determine what criteria will be used for the triggering event in light of the related production data captured.

Using the data found in steps 208 and 210, as well as the triggering event of step 204, the purge routine searches disposition rules at step 212 to identify a disposition plan that applies based upon the trigger event, purge criteria, and captured production data. The data acquired in steps 204 and 208–212 are processed by rules engine 140 of purge tool 134 at step 214. At step 216, it is determined if a purge candidate is found. A purge candidate refers to materials that meet the purge criteria identified in step 210 in light of the captured production data and triggering vent.

If no candidate is found at step 216, the process returns to step 202 whereby production operations are again monitored. If, on the other hand, a candidate for purging is found at step 216, rules engine 140 determines whether to issue a transport directive as a result of step 214 at step 218. For example, it may be determined that a transport directive will not be issued where a lot is already in a designated long-term storage area, or where a lot is in a designated area pending disposition. If rules engine 140 determines that no transport directive should be issued step 218, the process returns to step 202 where monitor 136 continues to observe production operations. Otherwise, parser 132 formats the search results into a format that is compatible with AMHS control application 130 at step 220.

At step 222 a transport process job 152 is created by purge tool 134 for directing the AMHS control application 130 on how the candidate materials are to be handed. A sample transport process job is shown in FIG. 4.

the transport process job is transmitted via AMHS interface 138 to AMHS control application 130 at step 224 and the production data 144 is updated in data repository 142 to reflect this transport activity.

As described above, the purge tool of the invention enables a production control manager or similar individual to establish customized guidelines for handling production materials assigned to a production line in a manufacturing environment. These guidelines can be changed over time as the needs of the manufacturing plant or enterprise change. The purge tool of the invention uses custom criteria to search materials in a production line for potential candidates for transport to storage, or alternatively, for scrapping purposes. Once a candidate has been identified, the purge tool creates a transport process job for the candidate materials and transmits the transport process job to the automated material handling system of the production environment for execution.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for facilitating a transport scheme in an automated material handling system environment, comprising:
   detecting an occurrence of a trigger event while monitoring production operations in an automated material handling system environment, said trigger event being user-defined;
   identifying a materials candidate to purge from a production line in response to:
   said trigger event;
   production data captured relating to said materials candidate; and
   user-defined criteria for purging materials from said production line;
   selecting a disposition plan for handling said materials candidate;
   generating a transport process job for said materials candidate operable for instructing said automated material handling system on executing said disposition plan; and
   transmitting said transport process job to said automated material handling system for execution.

2. The method of claim 1, further comprising updating production data to reflect activity conducted as a result of executed process jobs.

3. The method of claim 1, wherein said trigger event comprises at least one of:
   a timestamp;
   a full stocker;
   a WIP level achieved;
   a product type;
   a process time; and
   a throughput level.

4. The method of claim 1, wherein captured production data includes:
   stocker identification;
   stocker load;
   stocker capacity; and
   materials carried on said stocker.

5. The method of claim 4, wherein said captured production data further includes performance metrics for a stocker, including at least one of:
relative throughputs;
mean stocker cycle times for materials capacity;
peak stocker cycle times for materials;
stocker mean times between incidents;
stocker availability; and
alarm condition relating to at least one of:
carrier drops;
weight loads;
contamination control; and
charge build up on carriers.

6. The method of claim 4, wherein said captured production data further includes at least one of:
manufacturing process steps utilized on production materials; and
status of production activities occurring within a production area.

7. The method of claim 1, wherein said user-defined criteria includes:
an age of a product being manufactured;
type of product being manufactured;
a class of product being manufactured;
priorities established for scheduled materials as set out in a production schedule;
life span of materials in a production line; and
lots that have not been processed for a specified period of time.

8. The method of claim 1, wherein said disposition plan includes:
scrapping materials identified in said materials candidate;
transporting said materials candidate to a remote storage location; and
transporting said materials candidate to an alternate production area.

9. The method of claim 1, further comprising a user interface operable for defining said trigger event, said criteria, and said disposition plan.

10. The method of claim 1, further comprising:
parsing data relating to said materials candidate operable transforming said data into a format usable by said automated material handling system.

11. A storage medium encoded with machine-readable computer program code for facilitating a transport scheme in an automated material handling system environment, said storage medium including instructions for causing a server to implement a method, comprising:
detecting an occurrence of a trigger event while monitoring production operations in an automated material handling system environment, said trigger event being user-defined;
identifying a materials candidate to purge from a production line in response to:
said trigger event;
production data captured relating to said materials candidate; and
user-defined criteria for purging materials from said production line;
selecting a disposition plan for handling said materials candidate;
generating a transport process job for said materials candidate operable for instructing said automated material handling system on executing said disposition plan; and
transmitting said transport process job to said automated material handling system for execution.

12. The storage medium of claim 11, wherein said trigger event comprises at least one of:
a timestamp;
a full stocker;
a WIP level achieved;
a product type;
a process time; and
a throughput level.

13. The storage medium of claim 11, wherein captured production data includes:
stocker identification;
stocker load;
stocker capacity; and
materials carried on said stocker.

14. The storage medium of claim 11, wherein said captured production data further includes performance metrics for a stocker, including at least one of:
relative throughputs;
mean stocker cycle times for materials capacity;
peak stocker cycle times for materials;
stocker mean times between incidents;
stocker availability;
alarm condition relating to at least one of:
carrier drops;
weight loads;
contamination control; and
charge build up on carriers;
manufacturing process steps utilized on production materials; and
status of production activities occurring within a production area.

15. The storage medium of claim 11, wherein said user-defined criteria includes:
an age of a product being manufactured;
type of product being manufactured;
a class of product being manufactured;
priorities established for scheduled materials as set out in a production schedule;
life span of materials in a production line; and
lots that have not been processed for a specified period of time.

16. The storage medium of claim 11, wherein said disposition plan includes:
scrapping materials identified in said materials candidate;
transporting said materials candidate to a remote storage location; and
transporting said materials candidate to an alternate production area.

17. A system for facilitating a transport scheme in an automated material handling system environment, comprising:
a server executing an automated material handling system control application;
a data repository in communication with said server, said data repository storing:
trigger events operable for defining conditions for initiating a search for productions materials as candidates for purging;
purge criteria operable for defining conditions for executing a purge operation;
disposition operations operable for defining instructions for handling
production materials designated for purging; and
captured production data, said captured production data received from
production operations carried out on production materials occurring in said production area;

a production area in communication with said server via a communications network, said production area including:

at least one stocker carrying production materials;

at least one production bay including a process tool; and at least one transport vehicle;

a purge tool executing on said server, said purge tool including:

a monitor component;

a user interface; and a rules engine.

18. The system of claim 17, wherein said captured production data includes:

stocker identification;

stocker load;

stocker capacity; and materials carried on said stocker.

19. The system of claim 18, wherein said captured production data further includes performance metrics for a stocker, including at least one of:

relative throughputs;

mean stocker cycle times for materials capacity;

peak stocker cycle times for materials;

stocker mean times between incidents;

stocker availability; and alarm condition relating to at least one of:

carrier drops;

weight loads;

contamination control; and charge build up on carriers.

20. The system of claim 19, wherein said captured production data further includes at least one of:

manufacturing process steps utilized on production materials; and status of production activities occurring within a production area.

* * * * *